March 7, 1944.  R. J. RUTHS  2,343,329
DIESEL ENGINE
Filed Dec. 16, 1942   3 Sheets-Sheet 1
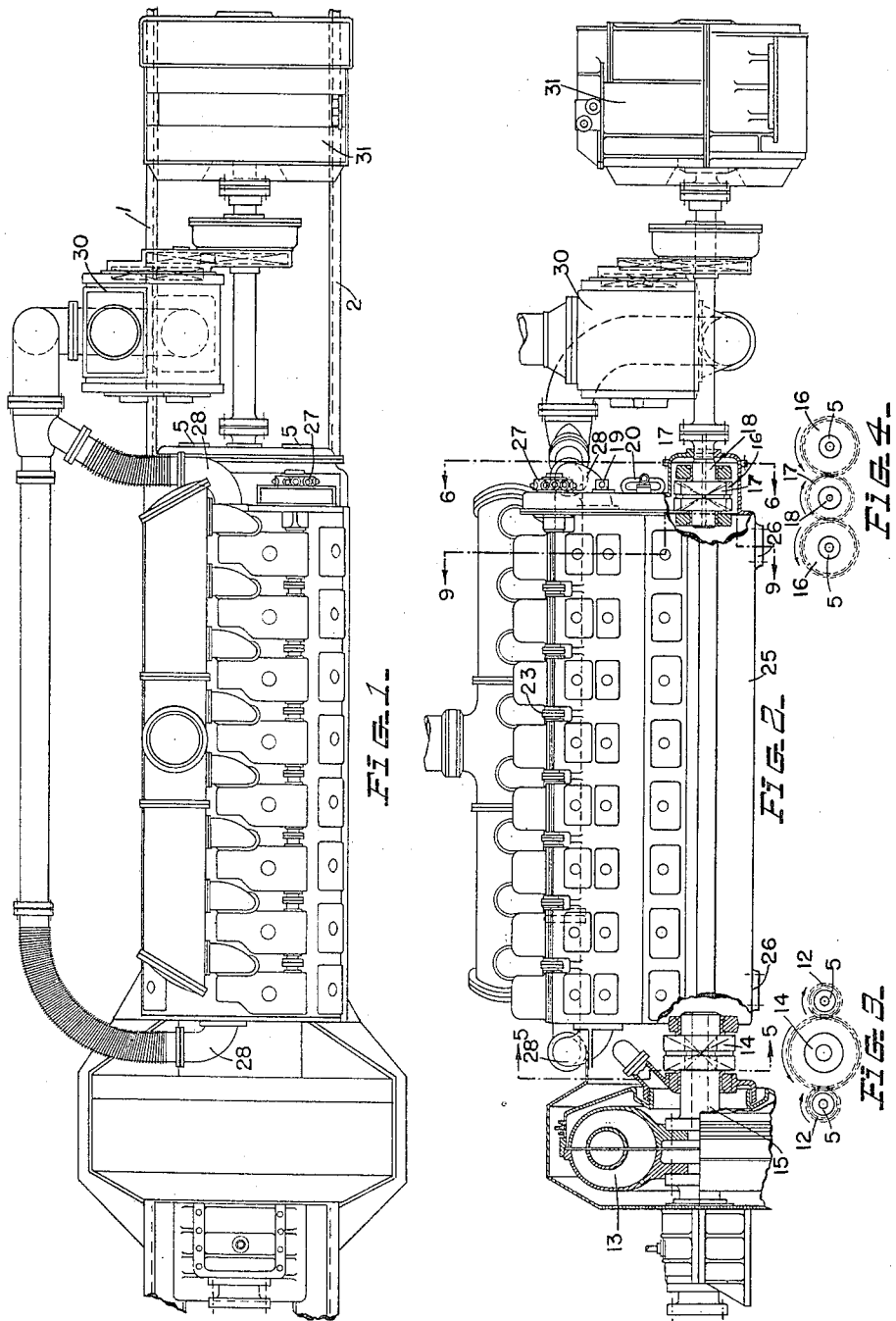
INVENTOR
ROBERT J. RUTHS
BY
ATTORNEY March 7, 1944. R. J. RUTHS 2,343,329
DIESEL ENGINE
Filed Dec. 16, 1942 3 Sheets-Sheet 2

INVENTOR
ROBERT J. RUTHS
BY
ATTORNEY

March 7, 1944.  R. J. RUTHS  2,343,329
DIESEL ENGINE
Filed Dec. 16, 1942  3 Sheets-Sheet 3

INVENTOR
ROBERT J. RUTHS
BY
ATTORNEY

Patented Mar. 7, 1944

2,343,329

UNITED STATES PATENT OFFICE 2,343,329

DIESEL ENGINE

Robert J. Ruths, Baltimore, Md.

Application December 16, 1942, Serial No. 469,209

10 Claims. (Cl. 123—53)

(Granted under the act of March 3, 1883, as amended April 30, 1928; 370 O. G. 757)

This invention relates to the construction of injection-type internal combustion engines having an inverted-V cylinder arrangement, a common combustion chamber at the vertex of the V for each pair of cylinders, and two crankshafts geared together.

In this type of engines it has been customary to take the drive off one or the other of the crankshafts for delivering power directly or through reduction or speed up gears to the driven means, thus it was necessary where the desired speed of operation of the driven means and the most economical speed of the engine were different, to sacrifice economy or introduce transmission gearing.

In the present invention the object is to make an engine of the above type more adaptable for furnishing direct drive at any desired speed while operating the engine at its most economical speed without the use of cumbersome gear reduction or speed up transmission means.

A further object is to obtain a compact engine whereby to produce a high specific horsepower per lb. and per unit of space occupied, without sacrificing accessibility of parts for the purpose of adjustment, assembly and repair.

A further object is to improve the accessibility of present submarine engine installations by making the overhead camshafts in sections for each individual pair of cylinders and making the individual combustion chamber heads separate so that the individual combustion heads may be readily removed and replaced when necessary without disturbing the assembly of the rest of the engine.

A further object is to eliminate remote control of the engine in the above installations by placing the blower and generator under the control station instead of between it and the engine, this being made possible by the use of smaller, higher speed units.

A further object is to obtain maximum efficiency from engines of the above type by having the inlet ports tangentially arranged around each cylinder and controlled by the pistons, while the exhaust ports are suitably arranged in the combustion chamber wall over the pistons, and are controlled by overhead poppet valves operated in unison in each combustion head by a common rocker arm from a single camshaft.

Further and more specific objects will become apparent as the description of these improvements proceeds in connection with the accompanying drawings, wherein:

Fig. 1 is a plan view of an illustrative form of my improved engine,

Fig. 2 is a side view thereof, partly in section,

Figs. 3 and 4 show diagrammatically the gear drive arrangement at the after and forward ends of the engine.

Similar numerals refer to similar parts throughout the several views of the illustrative form of my improvements which are applied to a submarine engine and which will now be defined in detail.

Two long steel supporting channels, 1 and 2, form the backbone of the submarine installations and provide a direct mounting for an oil engine, etc.

Figure 9:
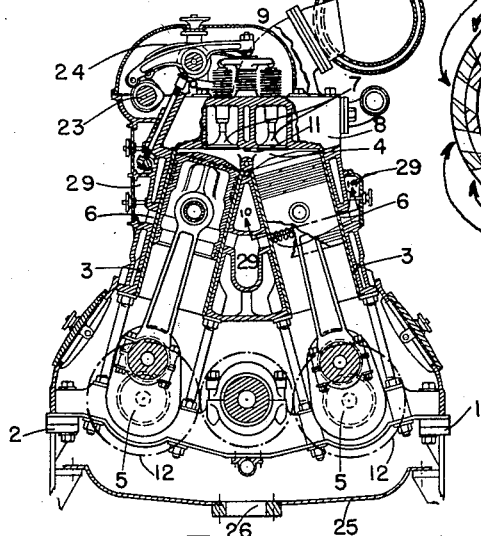
Fig. 9 is a section taken at 9—9 of Fig. 2.
Figure 10:
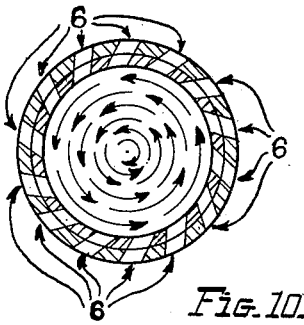
Fig. 10 is a section taken at 10—10 in Fig. 9.

This method is made clear in Figs. 1 and 9, in which the general structure of the oil engine is also indicated. Owing to the fact that this engine is of the relatively light-weight, high-speed type operating at 800 R. P. M. (top) with bore and stroke dimensions of 8.25 and 10 ins., respectively, the accommodation of the two crankchambers within the confines of the channels do not appear to offer any difficulty and apparently involve no sacrifice of accessibility. There is a double row of cylinders with cylinder liners 3 making sixteen in all. The engine appears to have gone a long way towards meeting the requirements of submarine technicians calling for minimum weight per H. P. and minimum space occupied.

Two cycle non-reversible operation is the fundamental feature of this engine, which is further characterized by the fact that the combustion spaces of pairs of cylinders are joined to form a single cavity 4. As the dual crankshafts 5 are geared together in such a way as to make the pistons travel up and down approximately together, it is easy to see how they would execute the compression and expansion parts of the oil engine cycle practically in the same manner as a machine of the conventional type: Ports 6 located in the cylinder liner permit an introduction of scavenging air and the escape of exhaust gases through the valves 7 in the head 8 with the result that the sweeping out of the spent gases is accomplished by a direct follow through of fresh air. The geared relation of the two crankshafts is of course one to one, but the meshing of the gear teeth in the timing is chosen in such a way that during the period when the exhaust valves are open and the scavenging inlet ports are open, the air has a direct sweep through; and from the time that the exhaust closes, the full pressure of the air, for scavenging is allowed to build up until the inlet ports are covered by the piston. It is to be borne in mind that this is really supercharging, and this feature is made possible by the use of a blower 30 which provides the cylinders with an extra quantity of fresh air, and in so doing adds to their power as though the bore, stroke and weights of the engine had been correspondingly increased. At the same time, the supply of the extra air by means of the blower involves only a fraction of the weight and cost which would have been the consequence of increasing the dimensions of the engine and supplying it with atmospheric air.

Fuel is injected by means of an individual plunger in the spray valve 10 and the jet 11 from the spray valve is divided in such a way that each of the twin cylinders gets its proper share. It is anticipated that clean combustion from relatively low-grade fuel will be obtained, while an indicator card with a round top, resembling that of the four-cycle machine, will be produced.

Mounted on each of the twin engine shafts 5 at the after end is a double helical gear 12 and, in combination with the hydraulic clutch 13, through driven gears possesses enough inertia to act as a fly wheel. The hydraulic clutch will also act as a vibration dampner. Both of the gears mesh with a common pinion 14 keyed to the power take-off shaft 15.

The gears 12 and pinion 14 are interchangeable for sets of different gear ratios between the twin shafts 5 and the power take-off shaft 15 to furnish any desirable speed reduction between these shafts. In the gear ratio illustrated, while the crankshafts turn at 800 R. P. M., the pinion 14 rotates at 325 R. P. M. which is the speed for which the propeller is designed to operate.

On each of the engine shafts 5 at the forward end is a double helical gear 16. Both of these gears 16 mesh with a common pinion 17 keyed to the forward power take off shaft 18. These gears are likewise interchangeable to furnish any desired gear ratio. In the gear ratio illustrated, while the crankshafts turn 800 R. P. M. this pinion rotates at 1000 R. P. M., a speed which allows a considerably smaller electrical generator 31 and blower 30, driven by this pinion shaft, to be used than would have been the case with direct-connected crankshaft driven units. In view of the demand made by submarine designers for a power plant of light weight, the latter feature should be of considerable importance.

This engine operates on the "two cycle" principal in which two strokes (down and up) of the pistons (one complete revolution of crankshaft) is necessary to complete the cycle.

One of the pistons leads the other by 10°. The cycle begins when the leading piston is 5° past its upper dead center. After the exhaust valves are closed and the pistons have covered the inlet ports, the air in the cylinder is compressed.

As the pistons approach the combustion dead center, fuel is injected at 12° before T. D. C. and is cut off at approximately 2° before T. D. C. Due to the heat of compression, the mixture of air and fuel burns and expands, forcing the pistons downward, thereby delivering work to the crankshafts. This burning and expanding of the gases continues until near the end of the power stroke.

At the end of the expansion or power stroke, the exhaust valves begin to open (85° before B. D. C.) allowing the burned gases to escape to the atmosphere through the exhaust system. The piston with the 10° lead starts uncovering the inlet ports a trifle earlier than the other. At this point, the pressure in the cylinders has dropped to about atmospheric. With the inlet ports uncovered, the scavenging air under pressure (2.5 to 4 lbs. per sq. in.), rushes into the cylinders with a whirling motion. The cylinders are swept clean of the remaining exhaust gases by the follow through of the fresh air and refilled for the next compression stroke. At the same time, some of this scavenging air has passed through the exhaust valves, cooling them, likewise the cylinder walls and piston. Now, due to the exhaust valve closing earlier (46½° after B. D. C.) than the inlet ports (51° after B. D. C.) this permits the scavenging air to continue to enter the cylinder (pressure plus inertia), thus resulting with the air in the cylinders being charged to approximately, or a trifle above, the scavenging air pressure.

The whirling motion of the air or turbulence at the inlet ports is obtained by the tangentially directed intake port openings. This turbulence persists throughout the injection period and is very beneficial in mixing the air and fuel.

Figure 5:
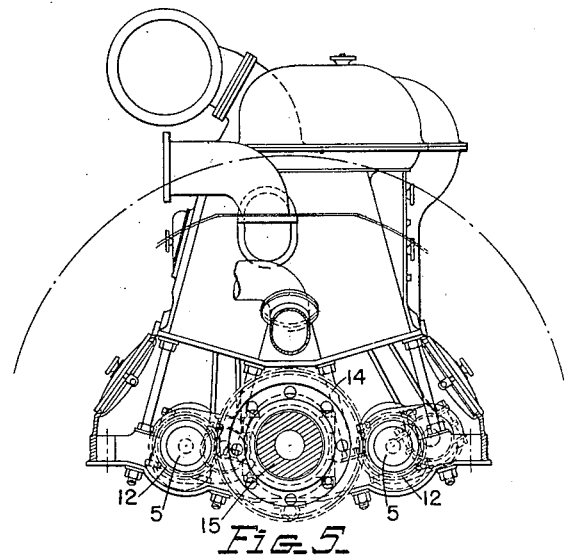
Fig. 5 is the forward end elevation, partly in section.
Figure 6:
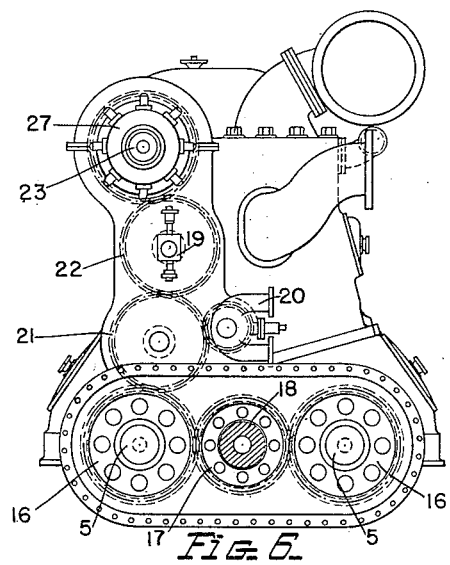
Fig. 6 is the aft end elevation.
Figure 7:
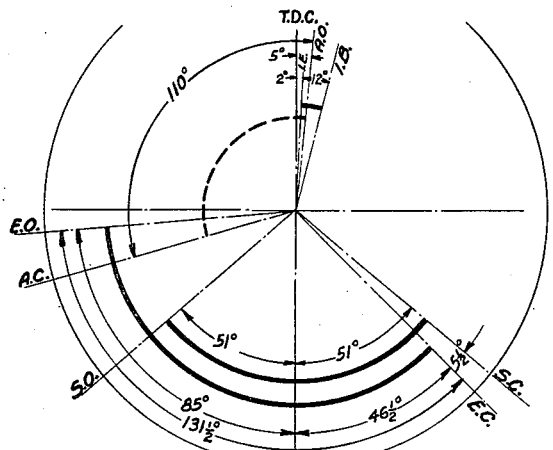
Fig. 7 is a timing diagram of the engine.
Figure 8:
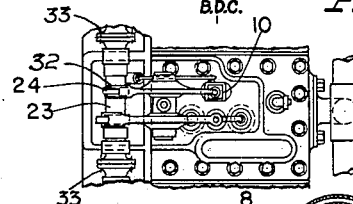
Fig. 8 is a plan view of an individual combustion chamber head.
Figure 11:
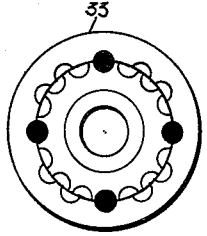
Fig. 11 is a detail of one of the flange couplings 33 which may be used on the camshaft.

Fuel is injected into the combustion space near the end of the compression stroke. The proper timing for the beginning and ending of the injection is accomplished by setting the camshaft in relation to the driving crankshaft, so that the injection pump plunger starts its delivery stroke at approximately 12° before T. D. C. and is cut off 2° before T. D. C. before the piston reaches the combustion dead center, as shown on the timing diagram, Fig. 7.

The symbols used in this diagram are A.O. for the time when the air starter valve opens; A.C., when the air starter valve closes during the starting operation. During normal running operation, the injection starts at the angle marked I.B. and ends at I.E. for full load. The exhaust valves open at E.O., the inlet and scavenging ports open at S.O., then the exhaust valves close at E.C. just before the inlet and scavenging ports close at S.C. The cycle of operation includes about 10° of fuel injection at full load, just prior to T. D. C. and the power impulse is delivered through approximately one quarter of a revolution until the exhaust valves begin to open followed by opening of the inlet ports when the pressure of the combustion gases has been relieved. The cylinders are then swept clean of the burnt gases until the exhaust valves close and a supercharging of the cylinders takes place before the inlet parts are closed by the pistons starting their compression strokes, at the end of which the fuel injection occurs and the cycle is repeated.

The fuel system consists of the conventional supply and injection systems. It consists of a service tank, a purifier with attached pump, a standby pump (not shown), a built-in supply pump 19, a filter and necessary piping and fittings. The supply pump is driven by the timing gears 21 and 22 as shown. The injector pumps including the spray valves 10 are inverted and are operated from above by a camshaft 23 with an individual cam 32 and through tappet assemblies 24, which transform the rotary motion of the camshaft into oscillations of the plunger. The plunger spring forces the plunger to follow the rise and fall of the cam.

The governing mechanism is of the conventional type; likewise, speed control, overspeed governor, and emergency stop.

The engine is equipped with pressure lubrication which supplies a continuous flow of oil to all surfaces requiring lubrication and consists of a positive pressure gear pump 20 and an oil header built in, an oil sump tank, a storage tank, a filter, a cooler and the necessary piping and fittings. The gear pump is driven through a gear drive, connected to the timing gears as shown. A relief valve set at approximately 48 pounds per sq. in. pressure is provided for the protection of the pump. The lubricating oil from the engine drains into the oil pans 25 and thence through two drains to the oil sump tank 26, located below the engine.

The air starting system, furnishing air to the engine proper consists of ships high pressure air, reduced to 1200 lbs. per sq. in. pressure or from air bottles at the same pressure. A reducing valve (1200 to 550 lbs. per sq. in) completes the system. Starting of the engine is accomplished by the action of the compressed air on the pistons. The engine starting system consists of the air starting mechanism 27 on the forward end of the camshaft of the engine, for distributing and admitting air to the cylinders in their firing order. The system is designed to insure instant turnover with the elimination of dead centers by admitting air to all of the cylinders until the engine begins to rotate.

An adequate supply of cool fresh water is essential for satisfactory operation of the engine. Only clean soft water, which is free from scale forming ingredients should be used in the cooling system. The cooling system used is a closed system in which fresh water is circulated through the engine. Normally, salt-water is used for cooling the engine water and the lubricating oil. The system consists of the fresh and salt water circulating pumps, combination water and lubricating oil cooler and the necessary piping fittings.

Scavenging air is supplied to the cylinders under a pressure of from 2 to 4 lbs. per sq. in. by means of a positive displacement type blower. The atmospheric air enters the inlet passage of the blower where it is caught by the lobes of the impellers against the walls of the blower housing and is forced through the outlet passage. From the discharge of the blower, the air is delivered to the forward and after ends of the receiver 29 in the cylinder block at 28.

This receiver is full length of the cylinder block. The scavenging air completely surrounds the cylinder liners at the port openings as shown at 29.

From the foregoing description it may be seen that some of the essential features of my improved engine are the double end drive, which may be designed for any speed of operation at each end relative to the engine speed, the individual combustion head construction including the sectional camshaft separable at the flange couplings 33, and the arrangement of inlet and exhaust ports and fuel injection nozzle in connection with this type of engine.

It is to be noted that the individual camshaft construction for each combustion head not only facilitates removal of these heads independently, but also permits adjustments between the cams for altering the timing of the cams to eliminate the effect of twist in the camshaft which is sometimes obtained in long camshafts under high torque conditions of camshaft operation where the drive gear is at one end of the long camshaft. A vernier adjustment between the camshaft coupling plates may be provided by having one more hole bored in the flange of one plate than in the other, so that a slight relative angular movement between the flanges will bring another pair of holes into alignment for bolting the plates together in any adjusted relation.

The use of the power shaft gear mounted between the crankshaft gears and at the same level permits the bearing pressure due to the downward force applied on one side of the power shaft gears by one crankshaft gear to be cancelled by that due to the upward force applied on the other side by the other crankshaft gear. Thus the power shaft is practically balanced during operation, and does not require as large bearings as would be necessary if the entire load was delivered to it by a force in one direction, as would be the case if the drive were taken off one of the crankshafts. Furthermore, each of the crankshafts gets approximately only 50% of the bearing load that would have to be borne by at least one of the crankshafts in the case of the crankshaft power delivery. Thus a considerable amount of weight as well as space is saved in the present construction.

The single combustion chamber arrangement for a pair of cylinders permits the use of comparatively large exhaust ports for the size of chamber which would be used with the equivalent single cylinder bore.

Various modifications in the above improvements may be made without departing from the scope of my invention as defined by the appended claims.

This invention may be made for or used by the Government of the United States for governmental purposes without the payment to me of any royalties thereon or therefor.

What I claim is:

1. An inverted-V type engine having a pair of crankshafts at the ends of the legs of the V, a separate power take-off shaft at each end of the engine having a pinion driven by gears on the crankshafts.

2. An inverted-V engine having a crankshaft at each end of the V, a gear at each end of each crankshaft, a pinion at each end of the crankshafts meshing between the crankshaft gears at the corresponding end, each of said pinions being mounted on a separate power take-off shaft for delivering power at any desired independent speeds relative to the engine speed.

3. An engine having a pair of parallel crankshafts, gears at the ends of said crankshafts, a separate drive shaft at each end of the engine having a gear meshing between the gears on corresponding ends of the crankshafts, thus reducing the bearing pressures 50% on that crankshaft which would otherwise serve as the drive shaft at the corresponding end of the engine where the power would be taken off.

4. The arrangement defined in claim 3 in which the axes of the independent drive shaft gears are both at the same level as the crankshaft axes.

5. The arrangement defined in claim 3 in which the gears are interchangeable so that different independent gear ratios may be obtained for the separate drive shafts, as may be desired for any particular installation combination.

6. The arrangement defined in claim 3 in which the gears are interchangeable so that different independent gear ratios may be obtained for the separate drive shafts, as may be desired for any particular installation combination, and wherein the axes of the separate drive shaft gears are in the same plane as those of the crankshafts, so that forces transmitted by the crankshaft gears to each of the separate drive shaft bearings will be balanced and thus will substantially eliminate any bearing pressures on either of the separate drive shafts.

7. An inverted-V type internal combustion engine having a common combustion chamber at the vertex of the V for each pair of cylinders on opposite legs of the V connected to a pair of crankshafts which are geared to a common drive shaft, a fuel injection nozzle and a pair of exhaust valves at the top of the chamber.

8. An inverted-V type internal combustion engine having a common combustion chamber at the vertex of the V for each pair of cylinders on opposite legs of the V connected to a pair of crankshafts which are geared to a common drive shaft, a fuel injection nozzle, a pair of exhaust valves at the top of the chamber, and a series of tangentially arranged inlet ports around the bottom of each cylinder controlled by the pistons for introducing scavenging air under pressure in a whirling motion to sweep out the burnt gases and furnish a charge of supercharged air after the exhaust valves are closed and prior to the compression.

9. In an internal combustion multi-cylinder engine for submarine installation or the like, an individual head for each combustion chamber having overhead tappets and valves mounted therein, a section of the overhead camshaft mounted thereon having coupling flanges for connection to the adjacent camshaft sections, and means on said flanges for fine adjustment thereof relative to the complementary flanges on adjacent sections.

10. In an internal combustion multi-cylinder engine of the inverted-V type, each pair of cylinders on opposite sides of the V having a common combustion chamber at the vertex thereof, a combustion chamber head therefor, a pair of exhaust valves mounted therein, one over each cylinder, a fuel injector between said valves, a common rocker arm for said exhaust valves, a rocker arm for said injector and a common camshaft section for operating said rocker arms having means for coupling to camshaft sections on adjacent heads.

ROBERT J. RUTHS.